K. MATTHIAS.
FRICTION CLUTCH.
APPLICATION FILED OCT. 6, 1909.

958,147.

Patented May 17, 1910.

UNITED STATES PATENT OFFICE.

KARL MATTHIAS, OF DESSAU, GERMANY.

FRICTION-CLUTCH.

958,147.  Specification of Letters Patent.  Patented May 17, 1910.

Application filed October 6, 1909.  Serial No. 521,410.

*To all whom it may concern:*

Be it known that I, KARL MATTHIAS, engineer, and a resident of the city of Dessau, Germany, have invented certain new and useful Improvements in Friction-Clutches, of which the following is a specification.

This invention relates to elastic claw-couplings of the type in which elastic members are inserted between the claws, which are preferably radially directed.

The object of the invention is to render such an elastic coupling capable of being readily thrown into and out of engagement, that is to say, capable of acting as a clutch. This is attained by forming the one set of claws rigid with the one clutch half, and by providing the other set upon a ring or the like loosely mounted on this clutch-half and capable of being forced into driving engagement with the other clutch-half, the elastic members being arranged between the fixed and the movable claws.

Figure 1:
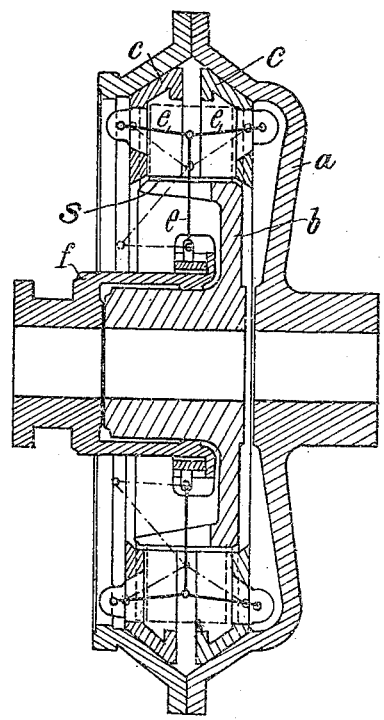
Figure 2:
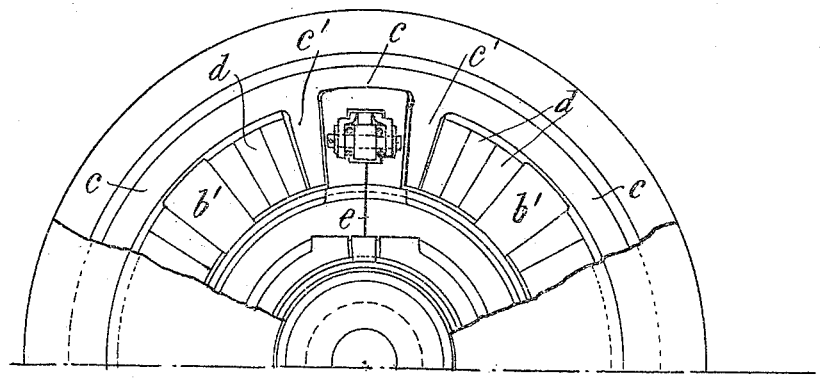

The accompanying drawings illustrate, by way of example, one form of clutch according to the invention, Figure 1 being a cross section and Fig. 2 a half front elevation with the upper fore part removed.

In carrying out my invention the clutch half $a$ is formed with a hollow conical friction surface and is preferably composed of two parts bolted or otherwise secured together. The other clutch half $b$ is formed with fixed claws $b'$ or the like. Two rings are slidably mounted around the member $b$ and are formed with claws $c'$, $c'$ or the like and elastic filling pieces $d$ are placed between the claws $b'$ and $c'$. The elastic filling pieces $d$ allow the two clutch halves to yield tangentially and axially relative to one another. In order to enable them to yield also perpendicularly relative to one another the rings $c$, $c$ are so arranged that a free space or play $s$ is formed between the inner ends of their claws $c'$, $c'$ and the clutch half $b$. By employing closed rings $c$, $c$ the defects due to centrifugal action are avoided. The peripheries of the two rings $c$, $c$ conform to the conical surface on the clutch-half $a$, and when the clutch is to be engaged the rings $c$ $c$ are forced axially against the friction-surface of the clutch-half $a$ by any suitable mechanism, such as a sliding sleeve $f$ with toggle-levers $e$. In this manner the two shafts upon which the members $a$ and $b$ are mounted are coupled together, while thorough elasticity is insured by means of the elastic members $d$.

The clutch above described may be applied to any of the usual purposes; for instance, it can be used for coupling loose pulleys and wheels with a shaft, as well as for coupling two shafts together.

Having thus described my invention, I declare that what I claim as new and desire to secure by Letters Patent is:—

1. a friction crutch, comprising two clutch halves, a pair of closed rings between the same, elastic means between said rings and one of said clutch halves, said ring and elastic means rendering the clutch halves capable of yielding tangentially, axially and perpendicularly relative to one another, and mechanism for bringing the said rings into and out of frictional engagement with the other clutch half.

2. A friction clutch, comprising two clutch-halves one of which is received by the other and presents peripheral claws, a pair of closed rings encompassing the said clawed clutch-half and having claws intermeshing with those of the latter, elastic members filling the spaces between the claws, and means for bringing the said rings into and out of frictional engagement with the outer clutch-half, substantially as described.

3. A friction clutch, comprising two clutch-halves, an outer one presenting a conical friction-surface and an inner one presenting peripheral claws; a pair of closed rings which encompass the inner clutch-half, and which present claws intermeshing with those of the latter, and whose peripheries together constitute a double conical friction-surface; elastic members filling the spaces between the claws; and means for bringing the said rings into and out of frictional engagement with the outer clutch-half; substantially as described.

Signed at Berlin, this 25 day of September, 1909.

KARL MATTHIAS.

Witnesses:
  WOLDEMAR HAUPT,
  HANS HEIMAN.